July 16, 1940.  H. H. ROTHSCHILD  2,207,896
SPINDLE BEARING DEVICE
Filed July 11, 1938  2 Sheets-Sheet 1
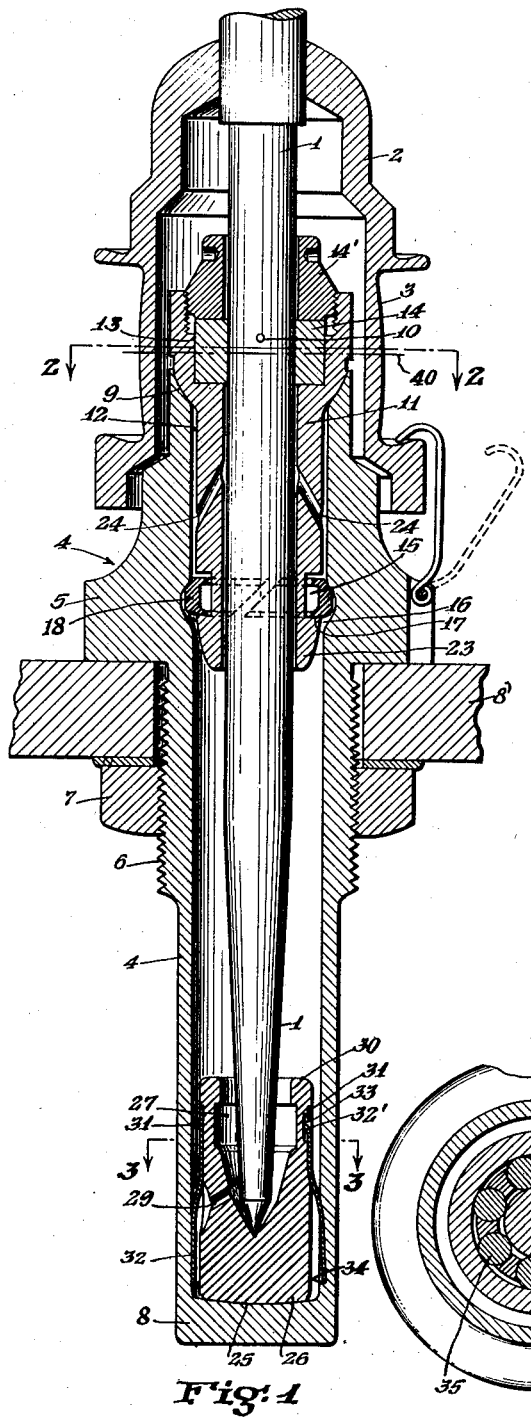
Fig: 1
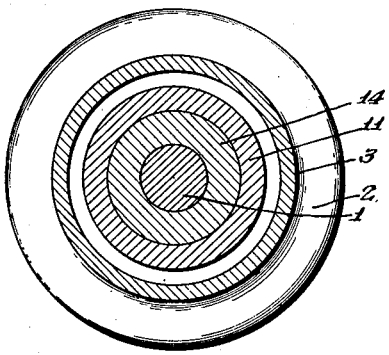
Fig: 2
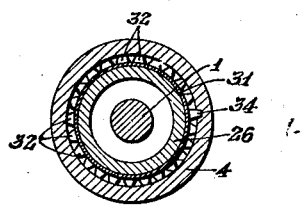
Fig: 3
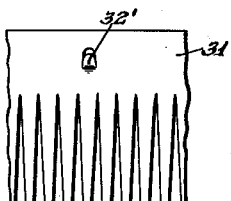
Fig: 4
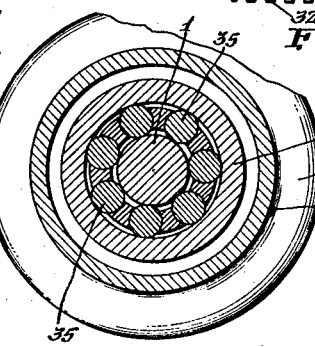
Fig: 5
INVENTOR.
Harry H. Rothschild
BY Walter S. Bleistein
ATTORNEY.

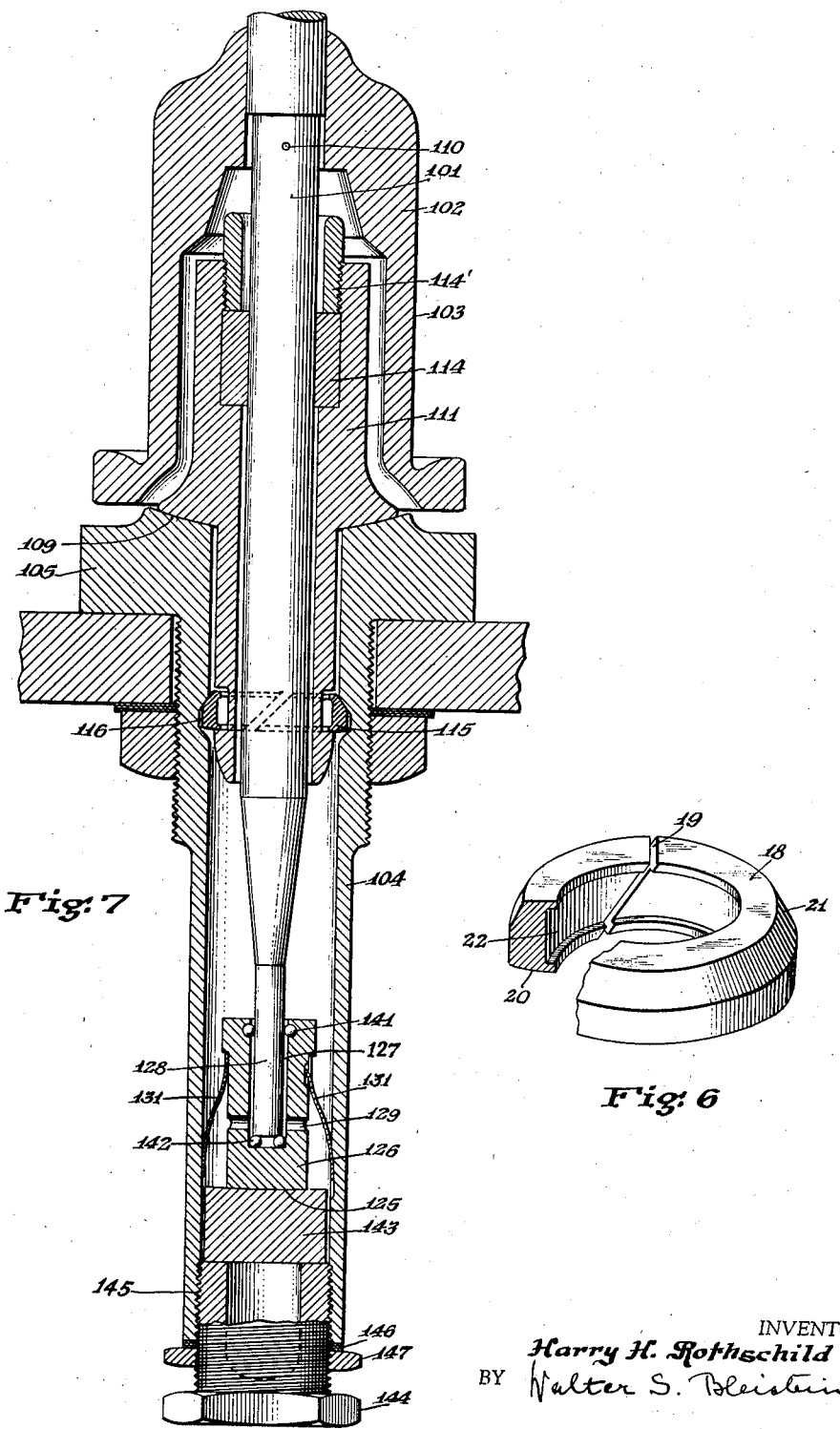

Patented July 16, 1940

2,207,896

UNITED STATES PATENT OFFICE 2,207,896

SPINDLE BEARING DEVICE

Harry H. Rothschild, New York, N. Y.

Application July 11, 1938, Serial No. 218,605

3 Claims. (Cl. 308—154)

The present invention relates to spindles and more particularly to bearing devices of spindles for spinning machines and twisters. The invention contemplates the provision of a spindle bearing in which the spindle proper is substantially free to adjust itself in relation to the center of gravity of the rotating masses under the influence of the forces acting thereupon. Such a self-adjusting spindle will be practically free from harmful vibrations which frequently occur in conventional devices. Therefore, it is an object of the present invention to provide a bearing device which permits the spindle to oscillate about the center of gravity of the rotating masses. Now, it must be borne in mind that said center is a definite point in a constant position only if the bare spindle is regarded. As soon as the spindle in operation begins to take up yarn material, the center in question travels upward on the spindle axis. Consequently, there is no fixed center of gravity of the rotating masses, and the geometric locus of this center is a certain portion of the spindle axis. The lower end of this portion is defined by the mass and shape of the spindle and the upper end by the shape, maximum size and weight of the material finally spooled on the spindle in addition to the mentioned qualities of the spindle proper.

Now, I have found that in order to minimize vibrations during the operation of the spindle it is generally sufficient, that the spindle is free to oscillate about a point approximately in the middle of the aforementioned portion of the spindle axis. Even if the point about which the spindle may oscillate is located nearer the lower end of said portion of the axis, the vibrations do not exceed admissible limits with the small spools of conventional size and shape. In consequence thereof, it appears to be permissible for the purposes of my invention to contemplate a point of said axis portion, if suitably selected in consideration of all circumstances, as a fixed center of gravity of the rotating masses which does not change its position during the operation of the spindle. Therefore, it is to be understood, that wherever I use the term "center of gravity of the rotating masses" in the specification hereinafter and in the appended claims, I wish to denote therewith a suitably selected point between the ends of said portion of the axis rather than the variable point which would correspond to a strictly physical definition of the term.

The present invention consists in a bearing device in which all elements which support the spindle in axial and radial direction are movable on spherical surfaces about the center of gravity of the rotating masses intended to be supported by the device.

The pulling forces caused by the tension of the yarns to be spooled on the spindle do not appear to contribute considerably to the causes of vibrations in conventional devices, seemingly, because these forces rotate uniformly about the spindle axis. The whirl drive, however, exerts a unilateral force upon the spindle, except in the event of a spindle drive by means of an individual electric motor. This force tends to shift or swing the spindle laterally.

The invention overcomes this drawback by arranging the transverse center plane of a collar bearing on the same level as the transverse center plane of the whirl surface engaged by a driving element such as a band, tape or belt.

Further details and objects of my invention will be apparent from the description hereinafter and the accompanying drawings illustrating several embodiments thereof by way of example. In the drawings:

Fig. 1 shows a longitudinal section of an embodiment of the invention;

Figs. 2 and 3 are sectional views along lines 2—2 and 3—3 respectively of Fig. 1;

Fig. 4 is a partial development of a part shown in Fig. 1;

Fig. 5 is a sectional view of a modification;

Fig. 6 is a perspective view of a part of the embodiment of Fig. 1, and

Fig. 7 is a longitudinal section of another embodiment.

In Figs. 1 to 6, a spindle 1 is shown, to which a whirl 2 is secured by conventional means (not illustrated), the whirl having a pulley surface 3. The bearing device for the spindle comprises a substantially cylindrical casing 4, having a flange 5, an exteriorly threaded portion 6 with a nut 7, and a bottom 8. With the aid of the flange and the nut, the casing 4 may be secured to a machine frame 8' or the like. The top surface 9 of the casing is spherically shaped, the center of the curvature being at 10, which is a point of the spindle axis, and also of the axis of casing 4. A bolster sleeve 11 is inserted in said casing so as to bear with its correspondingly shaped ball surface on the spherical surface 9 of the casing. Sufficient clearance is provided at 12 between sleeve 11 and the inner wall of the casing 4 to permit oscillating movements of the sleeve within the casing as will be described hereinafter. The upper portion of the bolster sleeve which protrudes from said spherical surface 9 is recessed at 13 and contains the collar bearing 14. A nut 14' is screwed into the topmost threaded portion to hold the bushing or bearing 14 in position. Instead of the bushing 14, an anti-friction bearing 35 may be used as indicated in the modification of Fig. 5. The lower portion of sleeve 11 has a circular groove 15 substantially in registry with an interior peripheral groove 16 of casing 4. The lower surface 17 of groove 15 is concave and spherically shaped having its center in the aforementioned point 10. Groove 16 has a roof shaped cross-section as clearly shown in Fig. 1. A ring 18 is in engagement with both the grooves 15 and 16. The ring illustrated on a larger scale in Fig. 6, consists of a resilient material and is slitted at 19. The lower ring surface 20 of the ring corresponds in shape to the spherical groove surface 17, and its outer surface is wedge-shaped at 21 corresponding to the inclination of the roof-shaped cross-section of groove 16. The ring may be recessed at 22 whereby the springing force may be adapted to the requirements. In order to assemble the bolster sleeve 11, ring 18 is first slipped over the lower end of the sleeve which is tapered at 23 for this purpose until it springs into groove 15. Then, the bolster sleeve 11 will be inserted into the casing 4 from its top, whereby ring 18 will be compressed sufficiently to pass the upper casing portion until it springs also into groove 16. It goes without saying that the outer diameter of the entirely compressed ring must not be greater than the inner diameter of the casing, and its inner diameter, when compressed must not be smaller than the smallest diameter of groove 15. When the ring is in position, it expands. In consequence thereof, it will be forced downward by the action of the roof or wedge-shaped surface of groove 16 in engagement with ring surface 21, and ring surface 20 will be pressed downward on groove surface 17. In consequence thereof, bolster sleeve 11 will also be pressed upon surface 9 and prevented from rising, while it is simultaneously free to slide on both surfaces 9 and 17, that means to oscillate about the center 10. By a forceful pull, however, exerted at the top of the bolster sleeve the latter may be removed owing to the compressibility of the ring under the action of the said wedge-shaped surfaces. Oil conduits 24 may be provided to permit circulation of oil from the interior to the exterior of the sleeve.

The inner surface 25 of the bottom of the casing is also spherically shaped with the center 10. On this surface rests a foot step bearing 26 having a correspondingly shaped lower surface. Body 26 is cylindrical and substantially narrower than the inner space of the casing so as to be able to slide laterally, i. e. radially on surface 25. It has a suitably shaped axial recess 27 to receive the foot step of spindle 1. An oil conduit 29 is provided in its wall which, at its upper end, has an inwardly projecting rim 30. This rim permits the removal of the foot step bearing with the aid of a tool applied from the top of the casing 4 and hooked under the rim. A resilient means is provided to exert a slight centering force upon body 26 so as to hold it in axial position. Said resilient means consists of a tubular member 31 which encloses the upper portion of body 26 and is secured thereto against rotation by a tongue 32'. Tongue 32' is pressed out of the material of member 31 and engages a recess or indentation 33 of body 26. As apparent from the development shown in Fig. 4, member 31 is slitted in its lower portion so as to form a plurality of strips 32. These strips are bent outwardly and bear resiliently against the inner wall of the casing 4. The casing 4 has a longitudinal groove 34 engaged by one of the strips as clearly shown in Fig. 1 and in Fig. 3. Thus, foot step bearing 26 is prevented from rotation but is free to yield in any radial direction to a force sufficient to overcome the slight resistance of the pertaining strip or strips 32.

The repeatedly mentioned point 10 is so selected that it corresponds to the definition given hereinbefore as to the center of gravity of the rotating masses intended to be supported by the device. Point 10 should not be lower than the lower end of the bearing 14. It is preferred to have point 10 located in the upper half of the bearing. In certain instances, however, as will be explained hereinafter, the best location of point 10 is even considerably higher. The plane on which the middle of collar bearing 14 is located and the middle of the pulley surface 3 coincide in a plane indicated by line 40. Any lateral force applied in this plane will thus be taken up by the bearing without tending to tilt the spindle in the latter. This is of particular importance if bearing 14 is an anti-friction bearing comprising balls, needles or rollers. Furthermore, it is advisable to arrange the spherical supporting surface 9 as close as possible to the bearing 14 although, in many instances, the small dimensions of the whirl will not permit to comply with the suggestion. The distance of the spherical surface 17 from surface 9 should be between one-fourth to one-half of the distance of spherical surface 25 from surface 9 in view of conventional spindle dimensions. The separation of the foot step bearing 26 from the bolster sleeve 11, or in other words, the shortness of sleeve 11 offers two important advantages: first, the oil capacity of the casing is unusually great in comparison to conventional casings of the same diameter, and second, the masses to be moved when the spindle tends to adjust its position are smaller than in the case of a sleeve comprising the collar bearing and the foot step bearing. The clearance between the outer wall of body 26 and the inner surface of the resilient strips 32 should be not less than $\frac{1}{12}$ of an inch for spindles of the size mostly in use.

Now it is apparent that the spindle is free to oscillate about the selected center point 10 since the sleeve 11 as well as the foot step bearing 26 can readily follow such movement on their spherical surfaces 9, 17 and 25 respectively. Consequently, the spindle will adjust itself in the position best suited under the prevailing forces. The resilient member 31 exerts only a slight correcting force tending to establish the vertical position of the axis. Owing to the selection of the center of oscillations in the center of gravity of the rotating masses the vibrations of the spindle are minimized.

In certain instances, it is desirable that the spindle can be adjusted as to its height within certain limits. Means may be provided, therefore, to alter the distance of the foot step bearing from the collar bearing. In the embodiment of Fig. 7, an example of such means is illustrated. In this figure, the casing 104 is open at its lower end which is interiorly threaded at 145. A screw with head 144 engages the threads 145 and carries a movable bottom or supporting member 143 for the foot step bearing member 126. The member 143 has a spherical upper surface with its center at 110. By turning screw 144 the supporting member 143, and, thus, foot step bearing member 126 may be raised or lowered. It is self-evident that screw 144 and member 143 may be made of one piece if this is preferred. Furthermore, it is advisable to fit member 143 tightly like a piston in the casing 104 in order to ensure its axial position. A gasket 146 and a check nut 147 are provided, the one to prevent oil from escaping, the other one to secure the adjusted position. The structure offers the additional advantage that the casing may be opened from below to remove sump oil. It will be noticed that the radius of the curvature of surface 125 can only be correct for one position of the member 143 with respect to the center 110. Owing to the fact that the distance of 125 to 110 is relatively great and that the range of adjustability of member 143 is only small, the occurring incorrectness is admissible. In order to facilitate the sliding of member 126 on surface 125 in every position, I prefer to curve surface 125 with a radius taken from point 110 to the lowest active position of member 143 and to curve the bottom surface of member 126 with a radius taken from point 110 to the highest active position of member 143.

In bearing devices for very heavy spindles such as bucket spindles, the tapered foot step illustrated in Fig. 1 is not applicable. Fig 7 shows a modified form of the foot step bearing which is suited to carry heavier loads. For this purpose body 126 is so designed as to be fitted with a foot step bearing and a collar bearing. The recess 127 of member 126 is cylindrical as is also the foot step 128 of spindle 101. An anti-friction foot step bearing 142 is provided at the bottom of the recess, and a collar bearing 141 near its top. The collar bearing may be a bushing, or a ball bearing as shown or it may be a needle bearing while a ball bearing 142 at the bottom of the recess is preferred.

The embodiment of Fig. 7 shows also a modified whirl 102 of a form as frequently used in the spinning of silk and rayon threads. The very high center of gravity 110 of the rotating masses and the height and narrowness of the whirl causes the arrangement of the spherical surface 109 on a lower level than suggested in the rule given hereinbefore. However, owing to the peculiarity of the drive in devices of this type, the unilateral force is usually smaller than that acting on spindles as shown in Fig. 1. Furthermore, the greater width of the belt engaging a whirl of the type 102 has a steadying effect on the spindle. In consequence thereof, the greater distance of surface 109 from collar bearing 114 will not be harmful.

Although I have described several embodiments of my invention I do not wish to limit myself to structure, and many alterations and modifications of the shape and combination of parts within the scope and spirit of my invention will be apparent to those skilled in the art.

What I claim is:

1. In a spindle bearing device, a casing, a bolster sleeve and a securing means, said bolster sleeve having an upper convex and a lower concave spherical surface, said casing having a concave spherical supporting surface for engagement with said convex surface of said sleeve, and said securing means having a convex spherical surface for engagement with said concave surface of said bolster sleeve, and being held substantially in a pre-determined position relatively to said casing, all said spherical surfaces substantially having a common center.

2. In a spindle bearing device, a casing, a bolster sleeve, a securing means for said bolster sleeve, and a foot step, said bolster sleeve having an upper convex and a lower concave spherical surface, said foot step having a lower convex surface, said casing having two concave spherical surfaces for engagement with said convex surfaces of said bolster sleeve and said foot step respectively, said securing means having a convex spherical surface for engagement with said concave surface of said bolster sleeve, and being held substantially in a pre-determined position relatively to said casing, all said spherical surfaces substantially having a common center near the center of gravity of the rotating masses intended to be supported by said device.

3. In a device of the type described, a casing, a bolster sleeve oscillatably supported in said casing, and a slitted resilient ring, said ring having a wedge-shaped upper surface and a convex spherical lower surface, said casing having a groove with a wall so shaped as to engage said wedge-shaped surface of said ring, said bolster sleeve having a concave spherical surface for engagement with said convex surface of said ring, and said spherical surfaces having a common center approximately in the center of oscillation of said bolster sleeve.

HARRY H. ROTHSCHILD.